June 11, 1940.    P. DANIELSSON    2,204,124
FISH-CLEANING MACHINE
Filed Nov. 28, 1938
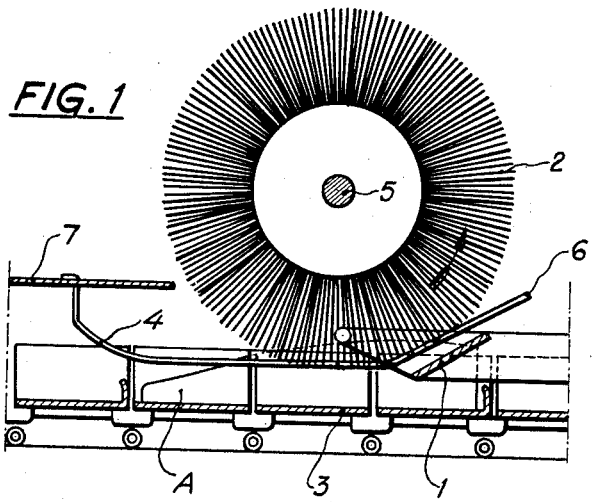
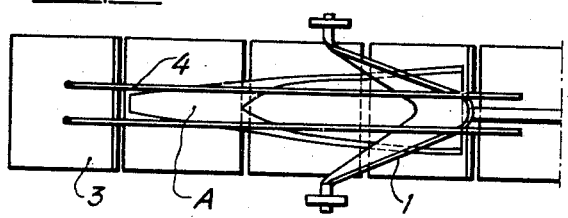
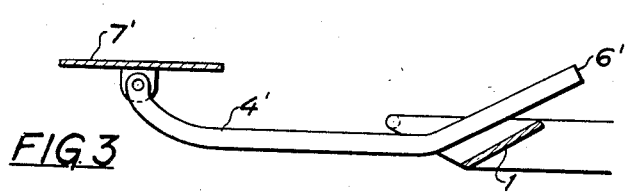
Inventor,
Paul Danielsson
By Sommers & Young
Atty.

Patented June 11, 1940

2,204,124

UNITED STATES PATENT OFFICE 2,204,124

FISH-CLEANING MACHINE

Paul Danielsson, Stockholm, Sweden, assignor to Aktiebolaget Gerk. Arehns Mekaniska Verkstad, Stockholm, Sweden Application November 28, 1938, Serial No. 242,816
In Sweden October 21, 1937

4 Claims. (Cl. 17—3)

This invention relates to fish-cleaning machines having a rotary brush or the like for cleaning the inside of opened fish, and it is an object of the invention to provide improved means for guiding and supporting the fish so as to prevent doubling or other injurious deformation of the fish when being subjected to the action of said brush or the like.

In the accompanying drawing is shown, by way of example, an embodiment of the invention, in which Figure 1 is a side view, partly in section, Figure 2 is a plan view, partly in section, several parts, namely, a brush and a plate, being omitted for clarity, and Figure 3 is a side view, partly in section, of a modified part of the apparatus.

Referring to the drawing, it is assumed that the fish A is conveyed longitudinally with its cut tail end foremost from a cutter (not shown) for splitting the belly of the fish and further below a device 1 for spreading and holding apart the sides of the fish and immediately thereafter below a rotary brush 2, driven in the direction of the arrow (Figure 1), so as to act upon the fish in a direction opposite to the fish-feeding direction. If the fish is soft the brush tends to double the fish resting in the conveyor pockets 3. In order to prevent this, metal rods or wires 4 are arranged longitudinally of the conveyor tangentially relative to the brush, i. e. transversely to the shaft 5 of the brush. The brush penetrates between the wires 4; i. e. the latter enter the brush.

The wires 4 are attached to a plate 7 by horizontally directed portions thereof as indicated in Fig. 1, and are flexible so that they can yield upwards away from the conveyor pocket into the brush. The free ends 6 of the wires which are directed in the direction of brushing rest yieldingly upon the device 1, so that they do not collect parts of viscera, but such parts, as, for instance, the swim, can by brushing action slide off the wire ends. Such removal will be facilitated if the ends of the wires are bent upwards, i. e. towards the brush 2 as shown. The wires 4 may (as shown in Figure 3) be replaced by other equivalent members, such as thin metal bars 4' positioned edgewise and having free rear ends 6'. Said bars or wires 4' may (as shown in Figure 3) be pivotally mounted on the plate 7' in such manner that they can adjust themselves yieldingly through their weight downwardly towards the conveyor pocket 3.

I claim:

1. A fish-cleaning machine having a rotary brush for cleaning the inside of the fish having their bellies split open, a device for holding the sides of the fish apart, a conveyor for advancing the fish longitudinally from said holding device past said brush in a direction transversely to the axis of rotation of said brush, means for driving said brush to act upon the fish in a direction opposite to the direction of movement of said conveyor, and thin rods for guiding the fish, said guide rods extending longitudinally of said conveyor from said holding device and through said brush, said rods having free ends directed oppositely to the direction of movement of said conveyor and terminating slightly beyond said brush to allow viscera adhering to said rods to be brushed off them.

2. A fish-cleaning machine having a rotary brush for cleaning the inside of the fish having their bellies split open, a device for holding the sides of the fish apart, a conveyor for advancing the fish longitudinally from said holding device past said brush in a direction transversely to the axis of rotation of said brush, means for driving said brush to act upon the fish in a direction opposite to the direction of movement of said conveyor, and thin rods for guiding the fish, said guide rods extending longitudinally of said conveyor from said holding device and through said brush, the ends of said rods directed oppositely to the direction of movement of said conveyor resting freely and yieldingly upon a support and terminating slightly beyond said brush to allow viscera adhering to said rods to be brushed off them.

3. A fish-cleaning machine having a rotary brush for cleaning the inside of the fish having their bellies split open, a device for holding the sides of the fish apart, a conveyor for advancing the fish longitudinally from said holding device past said brush in a direction transversely to the axis of rotation of said brush, means for driving said brush to act upon the fish in a direction opposite to the direction of movement of said conveyor, and thin rods for guiding the fish, said guide rods extending longitudinally of said conveyor from said holding device and through said brush, the ends of said rods directed oppositely to the direction of movement of said conveyor resting freely and yieldingly upon said holding device and being bent towards said brush to allow viscera adhering to them to be brushed off them.

4. A fish-cleaning machine having a rotary brush for cleaning the inside of the fish having their bellies split open, a device for spreading the sides of the fish apart, a conveyor for advancing the fish longitudinally from said spreading device past said brush in a direction transversely to the axis of rotation of said brush, and thin rods for guiding the fish, said guide rods extending longitudinally of said conveyor from said spreading device and through said brush, said rods having free ends projecting slightly beyond said brush and in the brushing direction.

PAUL DANIELSSON.